July 15, 1941.    S. MYERSON    2,249,634
SHADE GUIDE HOLDER
Filed May 26, 1939
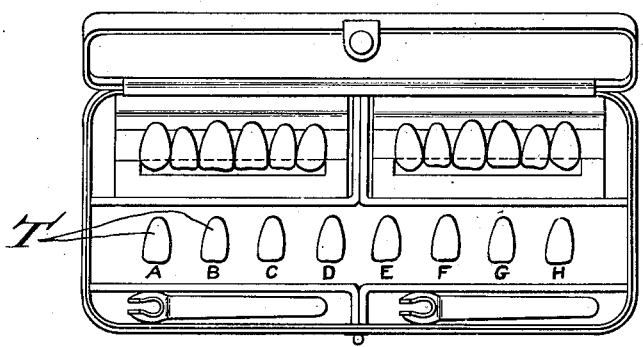
Fig. 6
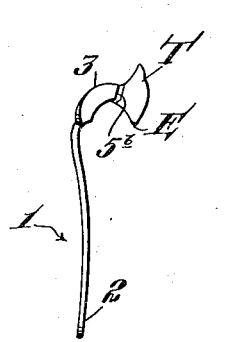
Fig. 1    Fig. 2
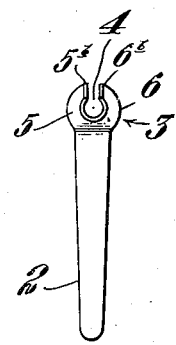
Fig. 8
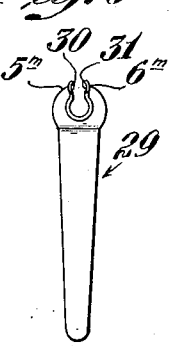
Fig. 7
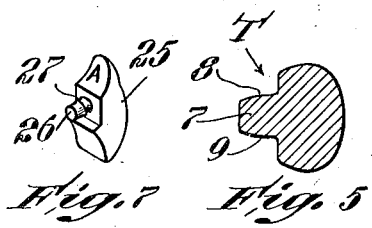
Fig. 5    Fig. 5ˣ
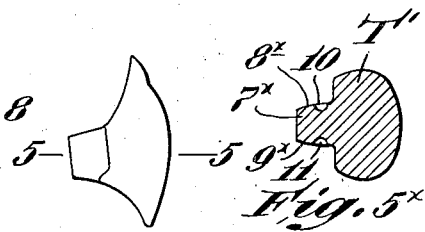
Fig. 3    Fig. 3ˣ    Fig. 4
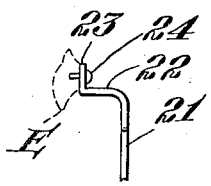
Fig. 9
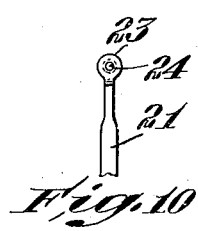
Fig. 10
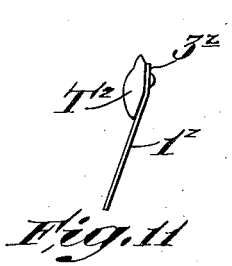
Fig. 11
Inventor
Simon Myerson
by Roberts Cushman & Woodberry
Att'ys.

Patented July 15, 1941

2,249,634

UNITED STATES PATENT OFFICE 2,249,634

SHADE GUIDE HOLDER

Simon Myerson, Brookline, Mass.

Application May 26, 1939, Serial No. 275,829

10 Claims. (Cl. 32—71)

This invention pertains to the art of dentistry and relates more particularly to means for matching artificial teeth with natural teeth. Natural teeth vary greatly in color and shading, not only as between different individuals but also as between the teeth in the same mouth, and in replacing a tooth or part of a tooth, for example, in making bridgework or crowns, as well as in making sets of artificial teeth, the careful dentist endeavors so far as possible to replace the missing tooth or teeth with artificial teeth suitable not only in shape and size but also in color and shading.

To assist the dentist in so matching artificial and natural teeth it is usual to provide artificial teeth in groups for matching purposes, the teeth in such a group progressively varying from one another, for example, in color, and being numbered successively or otherwise identified. Such a group is usually called a shade guide or color scale.

In preparation for putting in an artificial tooth or teeth in substitution for a natural tooth or teeth, the dentist (being provided with such a color scale) takes one tooth after another of the group and holds it closely adjacent to the natural tooth which is to be replaced, if the natural tooth is still in the patient's mouth, or, if the natural tooth has been removed, he may, by trial, determine which tooth of the shade guide group seems to produce the best effects when disposed in the space to be filled. Having thus decided by trial which of the matching group is most desirable, he notes the number of the selected tooth and then orders from the manufacturer by number the artificial tooth or teeth desired.

In order to hold teeth of such a shade guide in proper position for observation in the patient's mouth, it has been customary to provide each individual tooth of such guide with a permanently attached handle or support, usually of metal and so shaped that the tooth may conveniently be held with its gingival end adjacent to the patient's gum and so that a clear view of the tooth may be obtained unobstructed by the fingers of the operator. The tooth holders commonly used have been so devised that the incisal portion of the tooth directly overlaps and usually actually engages the material of the holder. However, the material of the holder thus disposed directly behind the usually thin incisal portion of the tooth has an appreciable effect upon the observed color and shade of the tooth so that though the tooth thus held may be matched properly with the natural tooth, a correspondingly numbered tooth, when fixed to a bridge or plate, may not match as desired. This is particularly true when the tooth is of the type described in the copending application of Simon Myerson, Serial No. 78,674, filed May 8, 1936, wherein the incisal part of the tooth is purposely made transparent or at least quite translucent so as to permit the darkness of the oral cavity to show through.

A principal object of the present invention is to provide a tooth holder for a tooth of a color scale so designed that the incisal portion of the tooth is substantially spaced from the adjacent parts of the holder whereby the color or light-obscuring or varying action of the holder has little if any effect upon the appearance and shade of the matching tooth, even though the incisal portion of the tooth be quite transparent.

While the present invention contemplates as a possibility the furnishing of each tooth of the matching group, in accordance with the usual practice, with an individual permanently attached handle embodying the improved construction above referred to, it is equally within the scope of the present invention and preferable to provide each individual tooth of the matching set with an attaching shank, boss or the like conveniently located, for instance at the lingual face of the tooth, and to furnish a single handle or holder having a socket or equivalent element for cooperation with the attaching boss or the like of the tooth, so that, in use, the dentist may merely attach one tooth after another of the matching set to the same holder. With such an arrangement it is economical to provide a single holder of a better finish and of more convenient shape and size for holding and manipulation than it is when each individual tooth has a permanently attached holder.

Other and further objects and advantages of the invention will be pointed out hereinafter in the following more detailed description and by reference to the accompanying drawing, wherein:

Fig. 1 is a side elevation illustrating a very simple and desirable form of holder in accordance with the present invention, showing a tooth secured in the holder in readiness for the performance of the matching operation;

Fig. 2 is a front elevation of the holder of Fig. 1 omitting the tooth;

Fig. 3 is a plan view, to larger scale, of the holder shown in Fig. 2;

Fig. 3× is a view similar to Fig. 3, but illustrating a slight modification;

Fig. 4 is a side elevation, to large scale, of a tooth of a shade guide designed for use with the holder of Figs. 1, 2 and 3;

Fig. 5 is a section on the line 5—5 of Fig. 4;

Fig. 5$^x$ is a view similar to Fig. 5 but illustrating a slight modification;

Fig. 6 is a diagrammatic representation of a desirable display case showing two sets of six anterior teeth, a holder corresponding to each set, and a group of eight color scale teeth;

Fig. 7 is a perspective to large scale showing a tooth having a holding boss of more or less conical shape on its lingual face;

Fig. 8 is a holder of modified construction designed particularly for use with the tooth shown in Fig. 7;

Fig. 9 is a side elevation of a holder embodying features of the present invention designed to have the tooth permanently united thereto, the tooth being shown in broken lines;

Fig. 10 is a front elevation of the holder of Fig. 9 with the tooth omitted; and Fig. 11 is a side elevation illustrative of a holder and matching tooth permanently secured thereto in accordance with usual practice.

Referring to the drawing, particularly to Figs. 1 to 6 inclusive, the numeral 1 designates a holder of simple form illustrating the broad principle of the present invention, such holder, as illustrated, consisting of a single piece of sheet metal shaped to provide the handle portion 2 and the attaching portion 3. The attaching portion is bifurcated to form the recess 4 and the spaced jaws 5 and 6. The metal forming the jaws 5 and 6 is twisted so that the inner surfaces 5$^a$ and 6$^a$ of the jaws lie in substantially parallel planes, the metal also being bent so that the jaws curve forwardly with the free ends or tips 5$^b$ and 6$^b$ of the jaws disposed in a plane which is spaced forwardly a substantial distance from the plane of the handle portion 2. As illustrated in Figs. 4, 5 and 6, each tooth T of the matching set is provided with a rearwardly directed boss 7 having lateral faces 8 and 9 which are in general parallel, though the boss preferably tapers slightly toward its outer end. This boss is designed to be engaged by the inner surfaces 5$^a$ and 6$^a$ of the jaws 5 and 6 respectively of the holder. The surfaces 5$^a$ and 6$^a$ are spaced a distance apart which is normally slightly less than the distance between the faces 8 and 9 of the boss 7 of the tooth so that when the boss is presented between these jaws the latter spring apart slightly, being somewhat resilient, and thus firmly grasp the tooth boss between them. In prior shade guide holders a broad, flat face of metal is disposed immediately behind the tooth, but by twisting the metal as above described so that the inner surfaces of the jaws of the holder lie in parallel planes, the passage of light through the tooth is but little obscured, and since only thin edges of the metal lie behind the tooth, the influence of the metal upon the color of the tooth is minimized. The tooth is thus held firmly in the position shown in Fig. 1 and the dentist may then grasp the holder by the handle portion 2 and place the tooth within the patient's mouth with the gingival surface of the tooth disposed adjacent to the patient's gum so that the tooth may be matched for color and appearance with the natural teeth. Since the attaching portion 3 of the handle is directed forwardly and the tips 5$^b$ and 6$^b$ of the jaws of the holder are spaced forwardly from the plane of the handle portion, the incisal edge E of the tooth is at a substantial distance forwardly from the nearest part of the holder and thus the passage of light through this incisal portion is not substantially obscured by the material of the holder. In contrast with the novel arrangement just described, Fig. 11 illustrates the usual construction wherein the holder 1$^z$ has the attaching portion 3$^z$ to which the tooth T$^z$ is directly secured by the rivet R. With this arrangement the incisal portion of the tooth either directly contacts the attaching portion 3$^z$ or nearly contacts it so that the latter very materially obscures the passage of light through the incisal portion of the tooth and affects the color of the tooth. In accordance with the present invention, wherein the incisal portion is spaced well away from the material of the holder, such obscuring of the light does not take place and an exact matching of the tooth is possible.

As illustrated in Fig. 7, the several teeth of the color scale are preferably provided on their gingival surfaces with numerals or letters to indicate the particular tooth of the set, and the display case (Fig. 6) has a series of sockets for the reception of the holding bosses of the teeth, from which the teeth may readily be removed at will. The dentist takes one tooth after another of the group, inserts its boss between the jaws or prongs 5 and 6 of one of the holders 1, and thus tries one tooth after another for matching purposes and when the proper tooth has been ascertained its number may be observed and then a corresponding tooth of the same color or other characteristics may be ordered from the manufacturer or distributor.

In Figs. 3$^x$ and 5$^x$ a holder and tooth of slightly different construction are illustrated, the jaws 5$^x$ and 6$^x$ of the holder being furnished at their inner surfaces with ribs 12 and 13, while the boss 7$^x$ of the tooth T$^1$ has grooves 10 and 11 in its lateral surfaces 8$^x$ and 9$^x$ for the reception of the ribs 12 and 13. With this arrangement there is no danger that the tooth will become detached from the holder during use.

Fig. 7 illustrates a tooth 25 which may be generally similar to that shown in Figs. 4 and 5 but which has a boss 26 of slightly tapering form projecting from its lingual surface, said boss being approximately circular in transverse section and having a peripheral groove 27 near its base. The holder 29 of Fig. 8 is designed especially for use with the tooth of Fig. 7, being generally similar to the tooth holder shown in Figs. 1 and 2 but having the tips 5$^m$ and 6$^m$ of its forwardly directed jaws formed with grooves 30 and 31, respectively, which face each other and cooperate to form a resilient walled socket for the reception of the boss 26 of the tooth 25. If desired, the forward ends of the tips 5$^m$ and 6$^m$ may have inwardly directed lips or flanges for engagement in the groove 27 of the boss.

In Figs. 9 and 10 a further modification is illustrated wherein the holder comprises the handle portion 21 and the integral forwardly directed portion 22 and the upwardly directed attaching portion 23, the latter having an aperture for the reception of a rivet 24 whereby the tooth is secured permanently to the holder. As in the previous arrangements the incisal portion and edge E of the tooth are held spaced forwardly at a substantial distance from the nearest adjacent part of the holder. The arrangement of Figs. 9 and 10 corresponds more nearly to usual prior arrangements in which each tooth of the matching set is furnished with its own individual handle or holder.

While certain desirable embodiments of the invention have been illustrated by way of example, it may be observed that in all of the various modifications shown the holder is so designed that the incisal edge of the tooth when mounted in the holder, is spaced away from any portion of the holder which might obscure or seriously interrupt the passage of light through the incisal part of the tooth or by proximity thereto affect its color. Although the invention has been illustrated in various embodiments it is understood that these do not necessarily represent all of the possible embodiments of the invention but that the invention is to be understood as broadly inclusive of any and all equivalent constructions falling within the terms of the appended claims.

I claim:

1. The combination with a shade guide tooth having a protuberance extending rearwardly from its lingual side, of a holder having a forked end, said forked end comprising spaced fingers having relatively wide faces and narrow edges, the fingers being so constructed and arranged that the wide faces adjacent the tips of the fingers constitute gripping elements which are normally spaced apart a lesser distance than the thickest portion of said tooth protuberance whereby the fingers coact to engage and resiliently but removably to hold said tooth protuberance introduced between said gripping elements, while the narrow edges of the fingers are extended forwardly toward the lingual side of the tooth so held in the holder, whereby the influence of the material of the holder upon the color of the tooth is minimized.

2. The combination with a shade guide tooth having a protuberance extending rearwardly from its lingual side, of a holder comprising a handle and a tooth-attaching member extending from the handle toward the lingual side of said shade guide tooth, said tooth-attaching member being constructed and arranged to resiliently grip and hold said tooth protuberance and having a narrow edge which is extended forwardly toward the lingual side of the tooth, whereby the influence of the material of the holder upon the color of the tooth is minimized.

3. The combination with a shade guide tooth having a protuberance extending rearwardly from its lingual side, of a holder comprising an elongate handle portion and spaced fingers extending forwardly from said handle adjacent one end thereof, said fingers having narrow edges at their tips, the fingers adjacent their tips coacting to resiliently engage and hold said tooth protuberance while said narrow edges are extended forwardly toward the lingual side of said tooth whereby the incisal edge of the tooth is spaced a substantial distance in front of the holder and the influence of the material of the holder upon the color of the tooth is minimized.

4. The combination with a shade guide tooth having a protuberance extending rearwardly from its lingual side, of a shade guide holder consisting of a unitary piece of sheet material shaped to provide a substantially flat handle and a forked end, said forked end comprising spaced fingers having relatively wide faces and narrow edges, the fingers being so constructed and arranged that the wide faces of the tips of the fingers are in substantially parallel planes and constitute opposed gripping elements which coact to engage and resiliently but removably to hold the protuberance of said shade guide tooth introduced therebetween, while the narrow edges are extended forwardly toward the tooth so held in the holder whereby the influence of the material of the holder upon the color of the tooth is minimized.

5. The combination with a shade guide tooth having a protuberance extending rearwardly from its lingual side, of a shade guide holder consisting of a unitary elongate piece of sheet metal having one end thereof bifurcated to form a pair of spaced fingers having relatively wide faces and narrow edges, the opposite portion of the piece constituting a substantially flat handle suitable to be grasped between the thumb and finger, the tip portion at least of each of the respective fingers having its wide faces disposed in planes substantially perpendicular to the plane of the handle portion with the edge of the sheet material directed forwardly, the extremities of the fingers constituting gripping elements for engagement with the protuberance of said shade guide tooth, the extremities of the fingers being disposed forwardly of the plane of the handle portion whereby, when a tooth is mounted in the holder, its incisal edge may be spaced a substantial distance from any part of the holder.

6. The combination with a shade guide tooth having a protuberance extending rearwardly from its lingual side, of a shade guide holder consisting of a unitary elongate piece of sheet metal having one end thereof bifurcated to form a pair of spaced fingers having relatively wide faces and narrow edges, the opposite portion of the piece constituting a substantially flat handle suitable to be grasped between the thumb and finger, the sheet material which forms the tip portion, at least, of each of the respective fingers having wide faces disposed in planes substantially perpendicular to the plane of the handle portion with the edge of the sheet material directed forwardly, the extremities of the fingers being disposed forwardly of the plane of the handle portion and being so constructed and arranged as to constitute gripping elements between which the protuberance of said shade guide tooth may be so removably held that the incisal edge of the tooth may be swung pivotally toward and from the handle about a horizontal axis substantially parallel to the plane of the handle, whereby the tooth may be mounted in the holder with its incisal edge spaced a substantial distance from any part of the holder and with the tooth inclined as desired with respect to the plane of the handle.

7. A shade guide holder consisting of a unitary elongate piece of sheet metal shaped to provide a substantially flat handle portion, suitable to be grasped between the thumb and finger, and a tooth-holding portion, the tooth-holding portion comprising a pair of spaced gripping elements between which a protuberance of a tooth may be introduced, said gripping elements being at the extremities of a pair of fingers integral with the handle portion, the material intermediate one, at least, of said gripping elements and the handle portion being twisted through substantially 90° thereby imparting stiffness to the holder, the fingers being resilient and so normally spaced that when the protuberance of a tooth is introduced between the gripping elements, the latter are sprung apart and thereby exert resilient stress for holding the tooth-protuberance in place between them.

8. The combination with a shade guide tooth having a protuberance extending rearwardly from its lingual side, of a holder comprising an elongate handle portion provided at one end with holding means which extends forwardly toward the lingual side of the shade guide tooth and which is operative by engagement with the tooth protuberance to unite the tooth and holder, whereby when the tooth protuberance is united to the holding means with the incisal edge in front of and extending transversely of the handle, the incisal portion of the lingual surface of the tooth will be spaced a substantial distance from any part of the holder thereby to minimize the influence of the material of the holder upon the color of the tooth.

9. The combination with a shade guide tooth having an integral protuberance extending rearwardly from its lingual side, of a holder comprising a handle portion provided at one end with holding means which extends forwardly toward the lingual side of the shade guide tooth and which is operative by engagement with the tooth protuberance to unite the tooth and holder, whereby when the tooth protuberance is united to the holding means with the incisal edge in front of and extending transversely of the handle, the incisal portion of the lingual surface of the tooth will be spaced a substantial distance forwardly from the handle thereby to minimize the influence of the material of the handle upon the color of the tooth.

10. The combination with a shade guide tooth having a protuberance extending rearwardly from its lingual side, said protuberance having indentations in its lateral surfaces, of a holder comprising an elongate handle portion provided at one end with a pair of forwardly directed arms having projections at their inner surfaces designed to engage the respective indentations in the tooth protuberance and thereby unite the tooth and holder, said arms being directed forwardly whereby the incisal portion of the lingual surface of the tooth is substantially spaced from the material of the handle when the tooth is disposed with its incisal edge in front of and extending transversely of the handle, thereby to minimize the influence of the material of the handle upon the color of the tooth.

SIMON MYERSON.